Oct. 27, 1942.   R. D. McLEOD   2,300,263
RAPID OPERATING VALVE
Filed Feb. 16, 1940   2 Sheets-Sheet 1

INVENTOR.
Roy D. McLeod
BY
Barnes, Kisselle, Laughlin & Raisch
ATTORNEYS

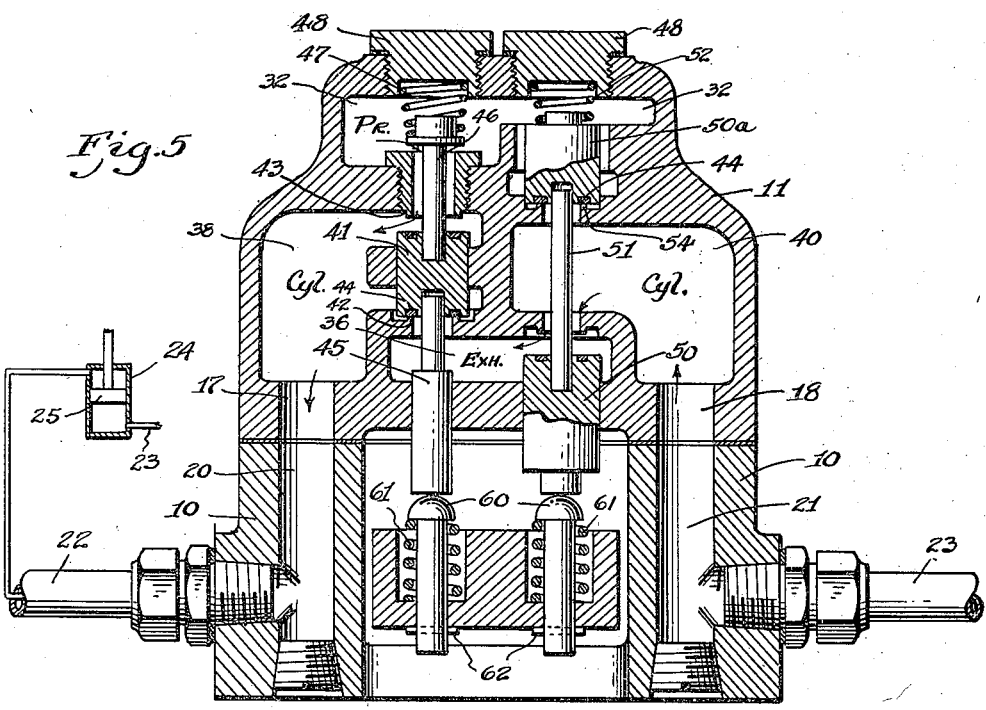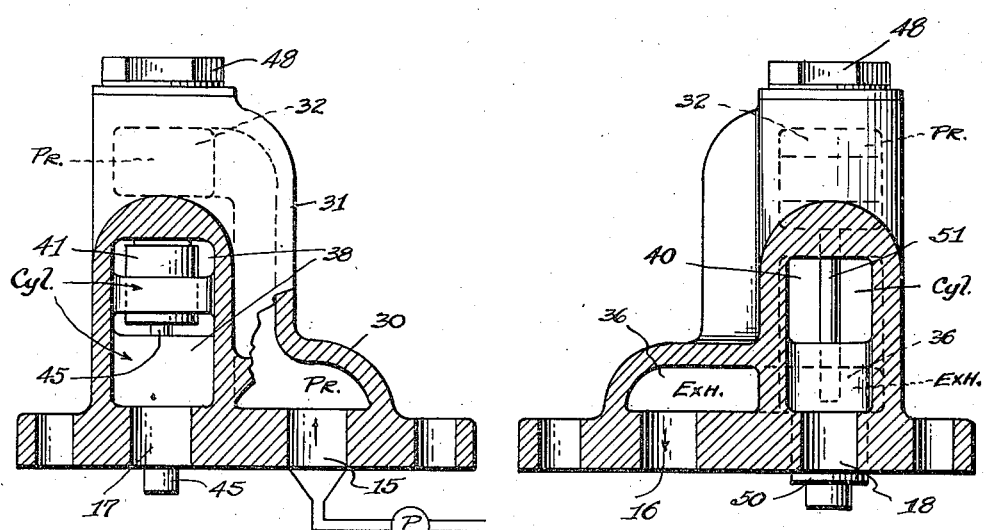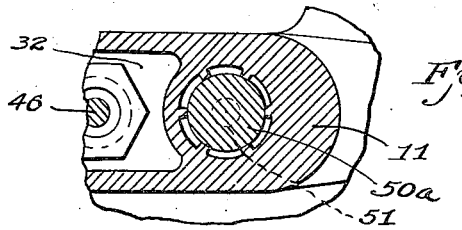

UNITED STATES PATENT OFFICE 2,300,263

RAPID OPERATING VALVE

Roy D. McLeod, Detroit, Mich., assignor to Ross Operating Valve Company, Detroit, Mich., a corporation of Michigan Application February 16, 1940, Serial No. 319,223

4 Claims. (Cl. 121—46.5)

This invention relates to rapid operating valves and has particularly to do with an air controlled valve adapted to rapid operation.

The present invention constitutes an improvement over a known type of valve in which poppet valves are located in a unitary housing and controlled manually or by solenoid. While these valves have many uses, one important use is in connection with a welding operation where the valves are connected to a double end air piston. The valve members are operated by a solenoid connected to a lever pivoted on the housing between the poppets. In these welding adaptations, it is necessary for the air piston to operate from two hundred to four hundred times a minute and at these high speeds, it has been difficult to provide a valve which will unfailingly operate the air piston at all times. In many instances when the speed of operation reaches two hundred to four hundred times a minute, there has been an unexplainable missing on some of the movements of the control lever. I believe that this missing is due to the pound or bouncing of the lever against the poppet on the side of the fulcrum away from the solenoid during the de-energizing or return stroke of the solenoid. This return stroke has been accomplished by means of a return spring acting on the lever and loaded sufficiently to lift the weight of the solenoid plunger or lever and also to operate one side of the valve against pressure. It is believed that on this return stroke the bouncing of the lever at the end of its movement causes a fluttering of the valve which contributes to the failure of the operation of the air piston at certain strokes of the solenoid.

The present invention solves these operating problems in two ways: First, both poppets are located on the solenoid side of the fulcrum pin to eliminate the necessity of a return spring; secondly, a valve has been designed to give reverse action of the poppets in the two strokes of the solenoid.

Another object of the invention is to design a valve in which slight discrepancies in the machining will not effect the operation and in which positive seating of the operating solenoid plunger is insured without strain on the operating parts. The necessity for packing and stuffing boxes is also eliminated by reason of the design.

A further object is to provide operation of the poppets by a novel poppet design and by the proper design of air passages. Other objects and features of the invention, having to do with details of construction and operation, as for example, the operation of the poppets and air passages, will be discussed in the following description and claims.

In the drawings:

Fig. 5 is a sectional view similar to Fig. 4 showing the valves in a different relative position.

Fig. 6 is a sectional view of the valve housing taken on lines 6—6 of Fig. 1.

Fig. 7 is a sectional view of the valve housing taken on the lines 7—7 of Fig. 1.

Fig. 8 is a section on lines 8—8 of Fig. 4.

Figure 1:
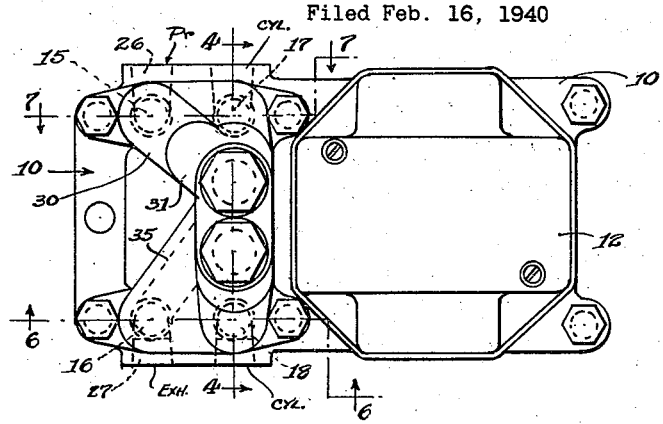
Fig. 1 is a plan view of a valve-solenoid combination.
Figures 2, 3:
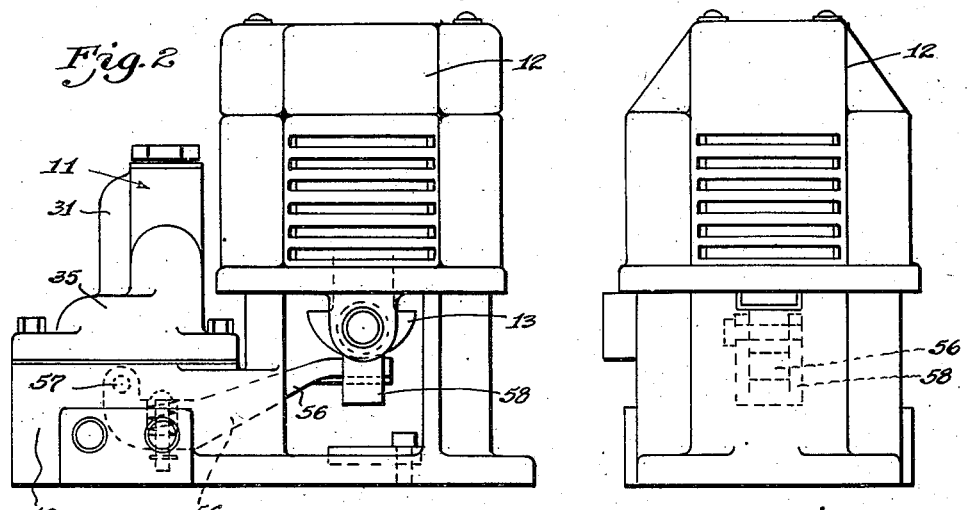
Fig. 2 is a side elevation of the housings of a valve and solenoid combination.
Fig. 3 is an end elevation of the same combination.

Referring to Figs. 1 to 3, a valve and solenoid base is shown at 10 supporting a valve housing 11 and a solenoid housing 12. Within the solenoid housing 12 is a solenoid coil, not shown, into which projects a plunger 13 which is movable by the energization of the solenoid. The plunger 13 is shown in the energized position and it will drop by gravity when the solenoid is de-energized.

The valve housing 11 has four openings in its base. Opening 15 is provided for a connection with a source of air under pressure. Opening 16 is an exhaust opening and openings 17 and 18 are to be connected to the operating ports of a cylinder. The base 10 is provided with suitable ports and connections leading to the openings 15 through 18 in the base of valve housing 11. Referring to Fig. 5, outlet 17 connects to a passage 20 in base 10, outlet 18 connects to a passage 21. These passages lead to conduits 22 and 23, respectively, which are connected with an operating cylinder 24 in which is located a piston 25. The pressure port 15 of housing 11 is connected to a passage 26 in base 10 while the exhaust port 16 is connected to a passage 27.

Referring to the chambers and ports within the housing 11, pressure port 15 passes from a foot portion 30 in the housing to a leg portion 31 which leads upwardly to a pressure chamber 32 which extends transversely of the housing at the top portion thereof. Exhaust port 16 leads through a foot portion 35 to an exhaust chamber 36 in the lower portion of the housing. Outlet ports 17 and 18 in the base of the housing 11 lead directly upward to operating chambers 38 and 40. These operating chambers are L-shaped and each have portions extending to a point in the housing 11 between the exhaust chamber 36 and the pressure chamber 32.

Figure 4:
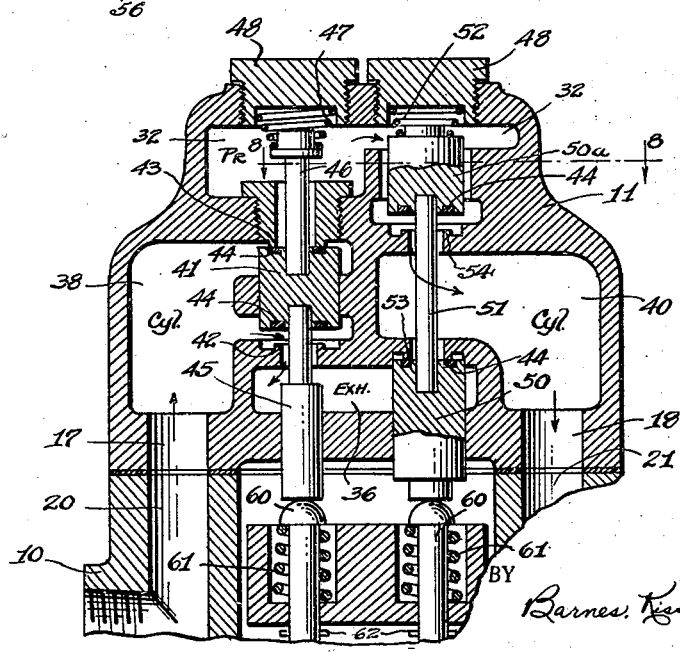
Fig. 4 is a sectional view of the valve housing taken on the lines 4—4 of Fig. 1 and illustrating the ports and passageways and valves.

Two parallel poppet valves are located in the housing 11, as illustrated in Figs. 4 and 5, one of these valves has a single valve member 41 adapted to cooperate with two valve seats 42 and 43. Valve seat 42 surrounds a passage between exhaust chamber 36 and outlet or cylinder chamber 38. Valve seat 43 is formed by a removable collar located in a passage between pressure chamber 32 and cylinder chamber 38. Recessed rings 44, formed of suitable rubber or substitute therefor, are provided in the valve member 44 for contacting the respective seats. Socketed in the lower part of the valve member 41 is a valve stem 45 which projects downwardly through the exhaust chamber 36 to a point outside the housing 11 and within the base 10. A valve stem 46 extends from the upper surface of valve member 41 to balance the lower valve stem and a light spring 47 acts on the upper valve stem to hold the parts in their relative positions. A removable plug 48 permits the removal of the valves.

The other poppet valve consists of two members 50 and 50a connected by a stem 51 which is recessed in a surface of each of the valve members. Valve member 50 projects down through the lower wall of housing 11 as does valve stem 45. A light spring 52 acts on the valve member 50a to hold the valve parts in their assembled relation as shown. Valve member 50 cooperates with a seat 53 surrounding a passage between cylinder chamber 40 and exhaust chamber 36. Valve member 50a is mounted in a fluted hole in housing 11 and cooperates with a valve seat 54 surrounding a passage between cylinder chamber 40 and pressure chamber 32 (see Fig. 8). Normally, when the valve is inoperative, pressure in chamber 32 will act on valve members 41 and 50a to hold the valves in the positions shown in Fig. 5. In this position pressure chamber 32 is open to chamber 38 and closed from cylinder chamber 40. Exhaust chamber 36 is closed from cylinder chamber 38 and open to cylinder chamber 40. With the valves in this position, a pressure will be exerted on top of piston 25 to urge it downwardly.

As previously stated, the valves are to be shifted by solenoid plunger 13. This solenoid plunger is connected to the valves by a lever 56, fulcrumed at 57, on base 10, and supported or fastened to the plunger 13 by a U-shaped member 58. Contact is made between lever 56 and valve stem 45 and valve member 50 by spherical top studs 60 which are urged upwardly by a spring 61 at a point between the fulcrum 57 and a solenoid plunger 58. Transverse pins 62 limit the upward movement of stud 60 but permit downward movement. When the solenoid plunger 13 is actuated, the right end of lever 56, as viewed in Fig. 2, will be lifted as it is shown and the valves 41 and 50 will be shifted upwardly so that the seats 43 and 53 are contacted. This closes pressure chamber 32 from cylinder chamber 38 and opens it to cylinder chamber 40, meanwhile, opening cylinder chamber 38 to the exhaust chamber 36 and closing the exhaust chamber from cylinder chamber 40. Springs 61 permit positive contact of members 41 and 50 with their respective valve seats without undue stress on the valve parts and the springs 61 also permit the solenoid plunger to seat positively in the solenoid coil on its upward stroke. If this positive seating is not permitted, the solenoid will burn itself out in a very short time. Valve stems 45 and 51 are preferably so dimensioned that when the valves are in the position shown in Fig. 5, there is a slight clearance between these valve stems and valve members 41 and 50a. This permits the pressure in chamber 32 to seat the members 41 and 50a without the necessity of working against the springs 61 surrounding studs 60.

It will be seen that, with the contact studs 60 located between the fulcrum 57 and the other end of lever 56, there is no necessity for a return spring for the lever or the valves. The valves are operated one way by pressure and the other way by the lever and the actuation in each direction is positive with no opportunity of rebound or fluttering. The dimensioning of the stems 45 and 51 eliminates the possibility of any slight discrepancies in the machinery affecting the operation, and by locating valve stem 45 and valve member 50, which serve as contact members, within the exhaust chamber, it will be seen that stuffing boxes and packing are unnecessary. The formation of pressure chamber 32 also contributes to the success of the operation since this chamber is restricted as it leaves the source side, rather than enlarged, therefore preventing any venturi effect. Fig. 8 shows the fluted passages between chamber 32 and valve seat 54 leading to chamber 40.

I claim:

1. A valve structure of the type having a housing, interconnecting chambers and channels, including pressure and exhaust, formed in said housing for the conducting of fluid pressure to and controlling the operation of, a double acting piston in a cylinder, a first valve in said housing positioned to control the pressure on one end of said cylinder, a second valve in said housing positioned to control the pressure on the other end of said cylinder, said first and second valves each being shiftable in the same direction to connect the ends of said cylinder respectively to a pressure chamber and exhaust chamber, and each being shiftable in the same opposite direction to reverse the connections between the pressure and exhaust chambers and the ends of said cylinder, valve stem means slidably connected to said first and second valves to effect shifting of the same, means to effect simultaneous shifting of said valves comprising a lever pivoted at one end of said housing, a solenoid operating on the other end of said lever, and means intermediate said ends for shifting said valves when said solenoid is energized.

2. A valve structure of the type having a housing, interconnecting chambers and channels, including pressure and exhaust, formed in said housing for the conducting of fluid pressure to and controlling the operation of a double acting piston in a cylinder, a first valve member in said housing positioned to control the pressure on one end of said cylinder, a second valve comprising a pair of members in said housing positioned to control the pressure on the other end of said cylinder, said valve members each being shiftable in the same direction to connect the ends of said cylinder respectively to a pressure chamber and exhaust chamber, and each being shiftable in the same opposite direction to reverse the connections between the pressure and exhaust chambers and the ends of said cylinder, means to effect simultaneous shifting of said valves comprising a lever member pivoted at one end adjacent said housing, means for operating the other end of said lever member, means intermediate said ends comprising spring pressed studs, and stem means located between said members arranged in cooperation with said spring pressed studs to provide lost motion at the initiation and completion of each stroke of said lever member.

3. A valve structure of the type having a housing, interconnecting chambers and channels, including pressure and exhaust, formed in said housing for the conducting of fluid pressure to and controlling the operation of a double acting piston in a cylinder, a first valve means to control the pressure on one end of said cylinder comprising a valve member located in a first outlet port of said housing arranged to be held in one position by pressure in an adjacent pressure chamber and in said position to close said outlet port from an exhaust chamber, said valve member being shiftable to close said outlet port from said pressure chamber and open it to exhaust, and a second valve means to control the pressure on the other end of said cylinder comprising a double end poppet valve, a first end being located in a pressure chamber and arranged to be held in a position by pressure in said pressure chamber to close said pressure chamber from a second outlet port, a second end being located in an exhaust chamber and arranged to control an opening between an exhaust chamber and said second outlet port, each of said valves being shiftable in the same direction against pressure in a pressure chamber to effect, respectively, a closing of said first outlet port from a pressure chamber and an opening of said first outlet port to an exhaust chamber, and a closing of said second outlet port from said exhaust chamber and an opening to a pressure chamber, means for shifting said valve means simultaneously against said pressure forces, comprising a lever fulcrumed adjacent said housing, means for operating said lever, a first valve stem having one end slidably mounted in said valve member and the other end extending from said valve member to a point outside said housing, a second valve stem having its respective ends slidably mounted in and connecting the ends of said second valve means, a valve stem extending from the second end of said second valve means to a point outside of the housing, and contact means on said lever for contacting said outwardly extending stems to shift said valve means, said contact means and said stems being dimensioned to provide a predetermined lost motion when said valve lever is actuated and to permit positive pressure seating of said valves when said lever is at rest.

4. A valve structure of the type having a housing, interconnecting chambers and channels, including pressure and exhaust, formed in said housing for the conducting of fluid pressure to and controlling the operation of a double acting piston in a cylinder, a first valve means to control the pressure on one end of said cylinder comprising a valve member located in a first outlet port of said housing arranged to be held in one position by pressure in an adjacent pressure chamber and in said position to close said outlet port from an exhaust chamber, said valve member being shiftable to close said outlet port from said pressure chamber and open it to exhaust, and a second valve means to control the pressure on the other end of said cylinder comprising a double end poppet valve, a first end being located in a pressure chamber and arranged to be held in a position by pressure in said pressure chamber to close said pressure chamber from a second outlet port, a second end being located in an exhaust chamber and arranged to control an opening between an exhaust chamber and said second outlet port, each of said valves being shiftable in the same direction against pressure in a pressure chamber to effect, respectively, a closing of said first outlet port from a pressure chamber and an opening of said first outlet port to an exhaust chamber, and a closing of said second outlet port from said exhaust chamber and an opening to a pressure chamber, means for shifting said valve means simultaneously against said pressure forces, comprising a lever fulcrumed adjacent said housing, means for operating said lever, a valve stem slidably connected with and extending from said valve member to a point outside said housing, a valve stem connecting the ends of said second valve means, a valve stem extending from the second end of said second valve means to a point outside the housing, and contact means on said lever for contacting said outwardly extending stems to shift said valve means, said contact means and said stems being so dimensioned that, when said lever is not operated, the positioning of said valve member and said first end will be independent thereof.

ROY D. McLEOD.